3,795,689
PROCESS FOR PREPARING FLUOROPERHALO-
ALKYL ISOCYANATES
Wilhelmus M. Beyleveld. Deventer, Netherlands, and
Bryce C. Oxenrider, Florham Park, and Cyril Woolf,
Morristown, N.J., assignors to Allied Chemical Corporation, New York, N.Y.
No Drawing. Filed July 9, 1971, Ser. No. 161,769
Int. Cl. C07c 119/04
U.S. Cl. 260—453 P                               6 Claims

ABSTRACT OF THE DISCLOSURE

Fluoroperhaloalkyl isocyanates are prepared by reacting the corresponding fluoroperhaloalkylidene imine with carbonyl fluoride in the presence of an ionizable fluoride salt.

---

In accordance with this invention, fluoroperhaloalkyl isocyanates having the formula $$F-\underset{Y_2}{\overset{Y_1}{\underset{|}{\overset{|}{C}}}}-NCO$$

wherein $Y_1$ and $Y_2$ are independently fluorine or fluoroperhaloalkyl radicals having either the formula $$CF_2X(CFX)_m-$$

wherein X is fluorine or chlorine and $m$ is 0 to 6, or the formula $$-\overset{\frown}{C}(\overset{\smile}{C}FX)_n$$

wherein X is fluorine or chlorine and $n$ is 3 to 5, are prepared by reacting a fluoroperhaloalkylidene imine having the formula $$\underset{Y_2}{\overset{Y_1}{\diagdown}}C=NH$$

wherein $Y_1$ and $Y_2$ are as defined above, with carbonyl fluoride in the presence of an ionizable fluoride salt under substantially anhydrous conditions in an aprotic, polar, liquid reaction medium. Formation of the fluoroperhaloalkyl isocyanate is represented by the following equation $$\underset{Y_2}{\overset{Y_1}{\diagdown}}C=NH + F_2C=O \xrightarrow{F^-} F-\underset{Y_2}{\overset{Y_1}{\underset{|}{\overset{|}{C}}}}-NCO + HF$$

wherein $Y_1$ and $Y_2$ are as defined herein.

The fluoroperhaloalkyl isocyanate is recovered from the reaction mixture in accordance with conventional methods, such as fractional distillation.

Suitable ionizable fluoride salts include potassium fluoride, rubidium fluoride, cesium fluoride, silver fluoride and tetra(lower alkyl) ammonium fluoride. Potassium fluoride is preferred. In addition to acting as a catalyst, the fluoride salt also acts as an acceptor of the hydrogen fluoride which is generated as a by-product. Accordingly, one mole of fluoride salt is consumed for each mole of hydrogen fluoride generated.

One mole of hydrogen fluoride is generated for each mole of isocyanate product produced; and one mole of product is produced by the reaction of one mole of each reactant. Hence, the reactants and the fluoride salt are consumed in a 1:1:1 molar ratio, although the three materials can be added to the reaction mixture in any relative proportion as desired. However, it is preferable to add an excess, up to a molar ratio of about 5:1, preferably up to 3:1, of the fluoride salt over the reactant which is present in the lesser amount on a molar basis.

If desired, the carbonyl fluoride reactant can be generated in situ by employing phosgene and a fluorinating agent for converting the phosgene to carbonyl fluoride. Suitable fluorinating agents include the ionizable fluoride salts recited above.

The fluoroperhaloalkylidene imine reactants are a known class of compounds, being described, for example, in U.S. Pat. 3,226,439, Journal of Organic Chemistry, vol. 30, p. 1398 (1965), and our copending application Ser. No. 14,653, filed Feb. 26, 1970, the pertinent subject matter of which is incorporated herein by reference.

Suitable aprotic, polar, liquid reaction media include acetonitrile, dimethylformamide, dimethylsulfoxide, dimethylacetamide, glycol ethers, cyclic polymethylene sulfones, and the like. Acetonitrile is preferred.

The reaction is conveniently carried out at room temperature, but temperatures above or below room temperature, e.g., about $-40°$ C. to about $200°$ C., can be employed if desired. Similarly, the pressure employed is not critical and can be above or below atmospheric pressure as desired. The reaction is conveniently carried out at pressures autogenously developed at the reaction temperatures employed.

In the preferred embodiments of this invention, $Y_1$ and $Y_2$ are independently fluorine or fluoroperhaloalkyl radicals having the formula $CF_2X(CFX)_m-$ wherein X is fluorine or chlorine, preferably fluorine, and $m$ is 0 to 6, preferably 0 to 3. In especially preferred embodiments, $Y_1$ is trifluoromethyl and $Y_2$ is trifluoromethyl or chlorodifluoromethyl, preferably trifluoromethyl.

The fluoroperhaloalkyl isocyanate products represent a known class of useful compounds, as described in U.S. Pats. 2,617,817 and 3,118,923 and our copending application Ser. No. 14,652, filed Feb. 26, 1970, the pertinent subject matter of which is incorporated herein by reference.

The following examples further illustrate the invention. In each example, the reaction was carried out under substantially anhydrous conditions.

EXAMPLE 1

An aerosol bottle containing 24 grams of potassium fluoride and 100 ml. of acetonitrile at $-78°$ C. was charged with 44 grams of hexafluoroisopropylidene imine. The bottle was then further cooled to $-190°$ C. and charged with 19 grams of carbonyl fluoride. As the reaction mixture warmed up to room temperature, the pressure rose to 35 p.s.i.g. and then rapidly dropped to about 0 p.s.i.g. before rising again, after about 5 minutes, to 40 p.s.i.g., and after 15 minutes, to 52 p.s.i.g. After being permitted to stand overnight, the reaction mixture was fractionally distilled to produce perfluoroisopropyl isocyanate, boiling point 20–23° C., at a yield of about 90%.

We theorize that the drop in pressure was due to the formation of an intermediate having the formula $$F-\underset{CF_3}{\overset{CF_3}{\underset{|}{\overset{|}{C}}}}-NH-\overset{O}{\overset{\|}{C}}F$$

which decomposes at the reaction conditions to the desired isocyanate product and hydrogen fluoride.

EXAMPLE 2

An aerosol bottle containing 6 grams of potassium fluoride, 50 ml. of acetonitrile, and 6 grams of chloropentafluoroisopropylidine imine at $-78°$ C. was charged with 35 grams of carbonyl fluoride. When the reaction mixture had warmed to room temperature, the gauge pressure was zero. After the reaction mixture had stood overnight at room temperature, the pressure had dropped to an absolute pressure of 50 cm. Hg. Upon fractional distillation of the reaction mixture, a good yield of chlorohexafluoroisopropyl isocyanate was obtained.

We claim:

1. A process for preparing a fluoroperhaloalkyl isocyanate having the formula $$\text{F}-\underset{Y_2}{\overset{Y_1}{\text{C}}}-\text{NCO}$$

wherein $Y_1$ and $Y_2$ are independently fluorine or fluoroperhaloalkyl radicals having either the formula $$\text{CF}_2\text{X(CFX)}_m-$$

wherein X is fluorine or chlorine and $m$ is 0 to 6, or the formula

wherein X is fluorine or chlorine and $n$ is 3 to 5, which process comprises reacting a fluoroperhaloalkylidene imine having the formula $$\underset{Y_2}{\overset{Y_1}{\diagdown}}\text{C}=\text{NH}$$

wherein $Y_1$ and $Y_2$ are as defined above, at a temperature of from about −40° C. to 200° C., with carbonyl fluoride in the presence of an ionizable fluoride salt selected from the group consisting of potassium, rubidium, cesium, silver and tetra (lower alkyl) ammonium fluoride under substantially anhydrous conditions in an aprotic, polar, liquid reaction medium.

2. The process of claim 1 wherein $Y_1$ and $Y_2$ are independently fluorine or fluoroperhaloalkyl radicals having the formula $\text{CF}_2\text{X(CFX)}_m-$ wherein X is fluorine or chlorine and $m$ is 0 to 6.

3. The process of claim 2 wherein $m$ is 0 to 3.

4. The process of claim 3 wherein X is fluorine.

5. The process of claim 1 wherein $Y_1$ is trifluoromethyl and $Y_2$ is trifluoromethyl or chlorodifluoromethyl.

6. The process of claim 1 wherein $Y_1$ and $Y_2$ are trifluoromethyl.

References Cited

UNITED STATES PATENTS 3,118,923   1/1964   Fawcett et al. _____ 260—453

OTHER REFERENCES

Samarai et al., Chemical Abstracts, vol. 69, 2681w (1968).

LEWIS GOTTS, Primary Examiner

D. H. TORRENCE, Assistant Examiner

U.S. Cl. X.R.

260—453 A, 453 AL, 566 D